United States Patent [19]

Baldyga

[11] Patent Number: 4,741,102

[45] Date of Patent: May 3, 1988

[54] METHOD AND DEVICE FOR SENSING ALIGNMENT

[75] Inventor: Joseph Baldyga, Isiamorada, Fla.

[73] Assignee: Diamond Die & Mold Company, Mt. Clemens, Mich.

[21] Appl. No.: 17,911

[22] Filed: Feb. 24, 1987

[51] Int. Cl.[4] ...................... H01R 43/04; B23P 19/00
[52] U.S. Cl. ........................................ 29/861; 29/748; 29/759; 29/566.2
[58] Field of Search ...................... 29/748, 759, 566.2, 29/861, 863

[56] References Cited

U.S. PATENT DOCUMENTS

| | | | |
|---|---|---|---|
| 3,264,860 | 8/1966 | Herb | 29/748 X |
| 3,707,756 | 1/1973 | Wolyn | 29/759 X |
| 3,839,776 | 10/1974 | Anderson et al. | 29/566.2 X |
| 4,654,952 | 4/1987 | Baldyga | 29/566.2 |

Primary Examiner—Howard N. Goldberg
Assistant Examiner—Carl J. Arbes
Attorney, Agent, or Firm—Basile and Hanlon

[57] ABSTRACT

An alignment sensing device for use with an article and an apparatus requiring alignment of the article in relation to the apparatus. The alignment sensing device has a first lever and a second lever with an aperture corresponding to a portion of an outer contour of the article. The first lever is pivotally mounted to the second lever, allowing rotation of the first lever relative to the second lever from a normal rest position to an engaged position. The alignment sensing device is movable toward the article, thereby initiating contact between the first lever and the article. The first lever begins to rotate from the normal rest position toward the engaged position, while the alignment sensing device continues to move toward the article. Subsequently, if the article is aligned with the apparatus, the aperture of the second lever matingly encompasses a portion of the outer contour of the article, while the first lever simultaneously reaches the engaged position which is sensed by the alignment sensing device. The alignment sensing device activates the apparatus in response to sensing the rotation of the first lever into the engaged position. If the article is not aligned with the apparatus, an alarm is triggered after a selectable time period has passed without sensing the rotation of the first lever into the engaged position. A bracket is provided to support the alignment sensing device from the apparatus.

16 Claims, 2 Drawing Sheets

METHOD AND DEVICE FOR SENSING ALIGNMENT

BACKGROUND OF THE INVENTION

1. Field of the Invention

The present invention is directed to an alignment sensing device for use in an apparatus in which the proper alignment of an article in relation to the apparatus may be sensed prior to activation of the apparatus and, further, to prevent the activation of the apparatus in the event that the article is improperly aligned or not present.

2. Description of the Prior Art

In the apparatus disclosed in my U.S. Pat. No. 4,598,570, electrical terminals to be crimped are fed in step-by-step movement to the apparatus. The terminals are integrally attached at one end to an elongate carrier strip, each step of movement of the carrier strip advancing a terminal into position on a stationary anvil of the crimping apparatus. The anvil is formed with a flat front surface lying in a general vertical plane and a vertically movable cutter element slides in face-to-face engagement with the front surface of the anvil. The face of the cutter engaged with the anvil is formed with a horizontal slot which slidably receives the carrier strip to position the terminal relative to the anvil and, in a normally maintained rest position, to guide the terminal onto the upper surface of the anvil. A vertically movable die assembly is mounted on the anvil and a terminal is advanced to the anvil by driving the carrier strip forward while the die assembly is in a raised position. When the terminal is located on the anvil, a wire is moved into alignment with the terminal and the die assembly is driven downward to perform the crimping operation. During this downward movement of the die assembly, the die assembly engages the cutter and drives the cutter downward. The carrier strip is trapped within the horizontal slot in the cutter, and downward movement of the cutter shears the terminal on the anvil from the carrier strip along the plane of engagement between the cutter and the vertical front face of the anvil. The die assembly is then raised and the cycle is repeated.

In the apparatus disclosed in a U.S. Pat. No. 4,654,952, a wire locater assembly for use in the crimping apparatus of the type referred to above is disclosed, in which the wire may be gripped by the locater closely adjacent the front vertical surface of the anvil so that the only portion of the wire not supported by the locater is that which vertically overlies the terminal.

In order to produce a satisfactory mechanical and electrical connection between the wire and the terminal, both the wire and the terminal must be accurately positioned so that the wire is centered between the opposed legs of the U-shaped section immediately prior to the crimping of the legs onto the wire. Accurate placement of the terminal also protects the die assembly from being damaged by attempting to crimp a terminal which is improperly aligned. The use of an elongate carrier strip to advance terminals into position on the stationary anvil of the crimping apparatus does not ensure proper alignment of the terminal on the anvil, since prior to being fed into position on the crimping apparatus, the terminal may have been bent out of alignment at the relatively short neck portion extending from the end of the U-shaped portion to the adjacent edge of the carrier strip. Furthermore, the trend toward miniaturization of electric circuitry and circuit elements has resulted in the usage of increasingly smaller terminals and relatively small or fine wires. The reduction in size of the terminal itself increases the degree of precision required to accurately align the wire and the terminal.

SUMMARY OF THE INVENTION

The present invention concerns an alignment sensing device for use with an electrical wire terminal crimping apparatus of the type in which an electrical terminal of generally U-shaped transverse cross section is positioned on a stationary anvil, an electrical conductor is located within the U-shaped terminal and a crimping die cooperable with the anvil is driven downward to fold the upstanding leg portions of the U-shaped portion of the terminal tightly around the conductor to mechanically crimp the terminal into assembled relationship on the end of the conductor. The alignment sensing device of the present invention is adaptable to other apparatus, although originally designed for use in a crimping apparatus such as that disclosed in my U.S. Pat. Nos. 4,598,570 and 4,654,952.

The alignment sensing device has a first lever and a second lever. The second lever has an aperture corresponding to a portion of an outer contour of an article and is positioned in vertical alignment with an apparatus. The alignment sensing device has means for pivotally mounting the first lever to the second lever and means for limiting pivotal rotation of the first lever relative to the second lever from a normal rest position to an engaged position. Additionally, the alignment sensing device has means for sensing when the first lever rotates into the engaged position and means for moving the alignment sensing device.

When the alignment sensing device is moved toward the article, the first lever contacts the article. The first lever then begins to rotate relative to the second lever from the normal rest position toward the engaged position as the alignment sensing device continues to move toward the article. Subsequently, if the article is aligned, the aperture of the second lever matingly encompasses a portion of the outer contour of the article and the first lever simultaneously reaches the engaged position, thereby activating the sensing means. In response to activation of the sensing means, the alignment sensing device has means for activating the apparatus. The alignment sensing device also provides means for triggering an alarm after a selectable time period has passed, in the event the sensing means has not been activated. Means for supporting the alignment sensing device from the apparatus are also disclosed.

The alignment sensing device includes a control circuit providing means for initiating the control sequence in response to an external signal that the article has been positioned on the stationary anvil, means for sensing the engaged position of the first lever, means for activating the apparatus in response to the sensing means, means for triggering an alarm after a selectable time period expires, means for activating the moving means of the alignment sensing device, and means for deenergizing the triggering means for the alarm.

Other objects and features of the invention will become apparent by reference to the following specification and to the drawings.

IN THE DRAWINGS

DESCRIPTION OF THE PREFERRED EMBODIMENTS

Figure 1:
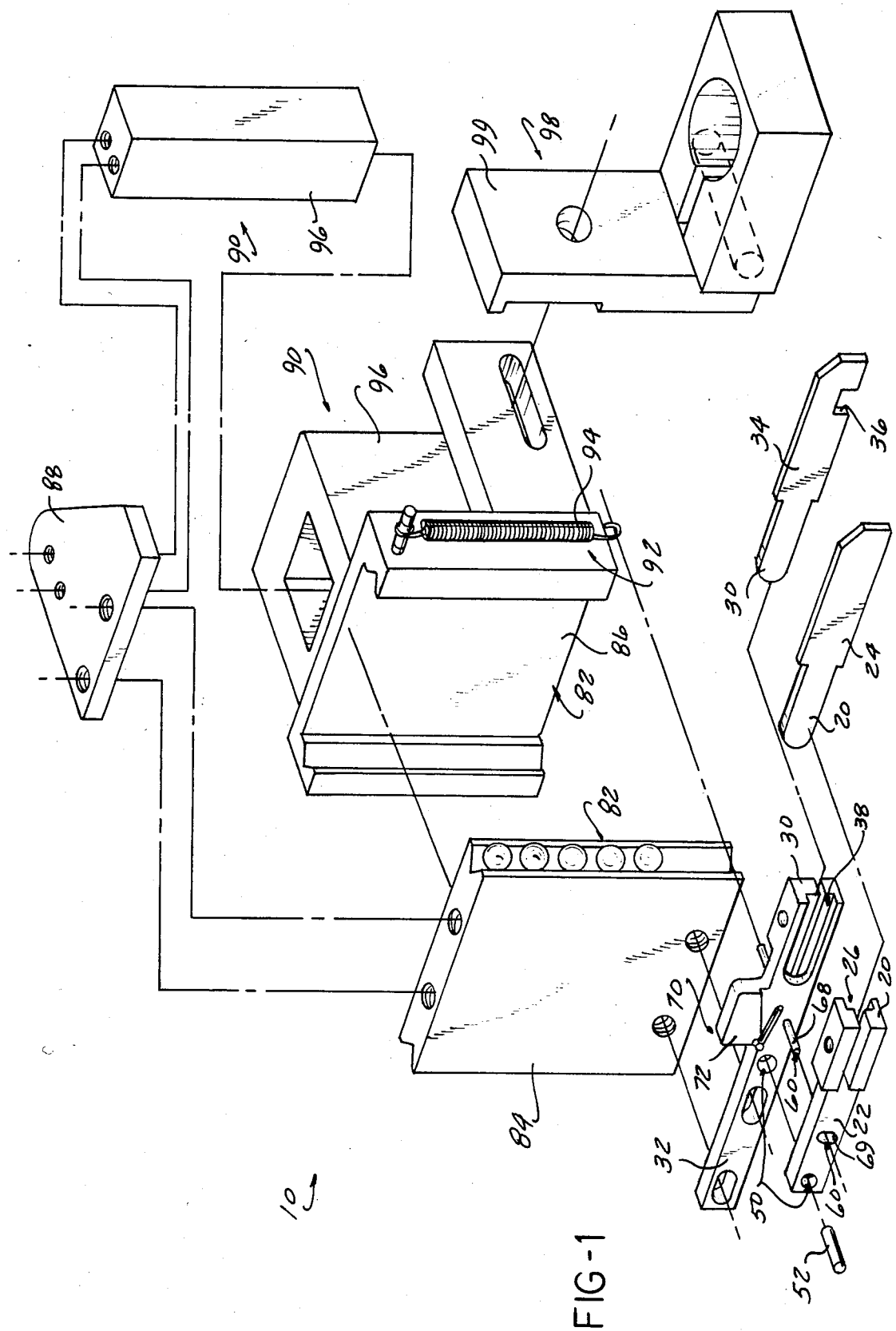
FIG. 1 is an exploded perspective view of an alignment sensing device, with certain electrical control parts omitted.

The alignment sensing device and method of the present invention are adaptable for use with numerous apparatuses, well known to those skilled in the art, which require an article to be aligned in relation to the apparatus prior to the apparatus's performing a task associated with the article. For description purposes, the alignment sensing device and method will be discussed herein with non-limiting references to a wire terminal crimping apparatus and a terminal.

Conventional elements of a crimping die apparatus with which the present invention can be employed include a stationary anvil 12 having a flat front surface 14 extending parallel to the direction in which the terminal carrier strip is fed to the apparatus. A vertically movable cutter is disposed in sliding face-to-face relationship with the front surface 14 of the anvil 12 and is normally biased to a ready position in which the carrier strip is received within the cutter slot to support the terminal 16 on the strip at an elevation such that the terminal 16 to be crimped rests upon the top of the stationary anvil 12. Downward movement of the cutter shears the strip from terminal 16 on the anvil 12 as the cutter is slid vertically downward along the front surface 14 of the anvil 12. Mounted above the anvil 12 is a vertically movable die assembly which carries crimping dies vertically aligned with the anvil 12. The dies are movable from a ready position spaced vertically above the anvil 12 to a crimping position wherein the dies crimp terminal 16 supported upon the anvil 12 about a conductor previously positioned within the terminal 16. In accordance with the present invention, an alignment sensing device 10 having a first lever 20 and a second lever 30 is mounted to one side of the die assembly above and immediately in back of the anvil 12.

Referring first to FIG. 1, the alignment sensing device of the present invention, designated generally as 10, has a first lever designated generally as 20, and a second lever designated generally as 30. The first lever 20 can be of unitary construction, or can be constructed having a lever bracket 22, a lever arm 24 and means 26 for releasably securing the lever arm 24 to the lever bracket 22. The second lever can also be of unitary construction, or can have a sensor bracket 32, a sensor arm 34 having an aperture 36 corresponding to a portion of an outer contour of an article 40 to be aligned, such as the terminal 16 previously mentioned, and means 38 for releasably affixing the sensor arm 34 to the sensor bracket 32. Means 50 for pivotally mounting the first lever 20 to the second lever 30 are provided. The pivotal mounting means can comprise a pin 52. Means 60 for limiting pivotal rotation of the first lever 20 relative to the second lever 30 from a normal rest position 62 to an engaged position 64 is also provided. The pivotal rotation limiting means 60 can comprise a projection 68 which slidingly engages within an oblong slot 69.

Figure 2:
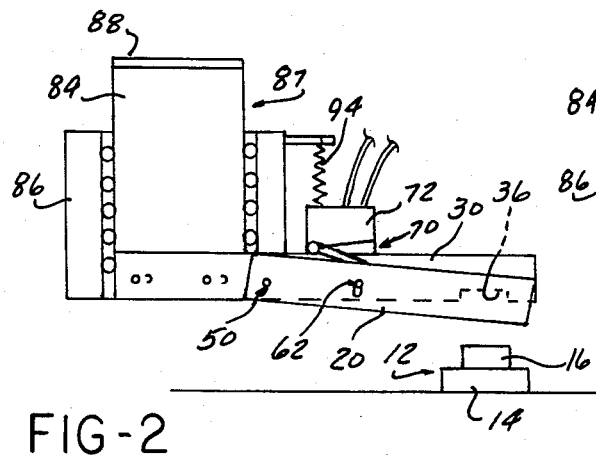
FIG. 2 is a front view of the alignment sensing device showing the first lever in a rest position.

The alignment sensing device 10 has means 70 for sensing when the first lever 20 rotates into the engaged position 64. The sensing means 70 can comprise a sensor 72 mounted on the sensor bracket 32. Means 80 for moving the alignment sensing device 10 are provided. The moving means 80 can comprise the following elements; means 82 for rectilinear extension; means 92 for biasing the alignment sensing device 10 away from the article 40; an actuator 90; and means 102 for activating the actuator 90 in response to an external signal that the article 40 has been positioned on the stationary anvil 12. The rectilinear extension means 82 can comprise a slide 84 adjustably affixed to the sensor bracket 32. The slide 84 is guided by a slide support 86 for movement between a normal retracted position 87 and an extended position 87'. An actuator arm 88 is fixedly attached to the slide 84 at one end and an actuator 90 at the opposite end. The actuator 90 could comprise a hydraulic or pneumatic cylinder or a solenoid 96. The biasing means 92 urges the alignment sensing device 10 toward the retracted position, such that it is held in a position away from the article 40 prior to activating the actuator 90, see FIG. 2. The biasing means 92 can comprise a spring 94 to urge the alignment sensing device 10 away from the article 40 after sensing, while a second article 40 is positioned on the stationary anvil 12 to be sensed. The activating means 102 activates the actuator 90 in response to an external signal 100 that the article 40 is positioned on the stationary anvil 12, causing movement of the alignment sensing device 10 toward the article 40. Means 110 for triggering an audible and/or visual alarm 112 if the sensing means 70 fails to sense alignment after a selectable time period are also provided. Means 98 for adjustably supporting the alignment sensing device 10 from the apparatus, such as support bracket 99, are also disclosed.

When the actuator 90 is activated, the alignment sensing device 10 moves toward the article 40 and a timer 110 with a selectable time period is energized. The timer 110 activates an alarm if alignment of the article 40 in relation to the apparatus is not sensed within the selected time period. As the alignment sensing device 10 moves toward the article 40, contact is initiated between the first lever 20 of the alignment sensing device 10 and the article 40. As the alignment sensing device 10 continues to move toward the article 40, the first lever 20 rotates relative to the second lever 30 from a normal rest position 62 toward an engaged position 64. If the article 40 is aligned with the apparatus, the alignment sensing device 10 reaches a full extended position 87', the aperture 36 of the second lever 30 matingly engages the portion of the outer contour of the article 40, as the first lever 20 simultaneously reaches the engaged position 64, see FIG. 3. The engaged position 64 of the first lever 20 is sensed by the sensing means 70 and means 104 for activating the apparatus are energized. Upon activation of the apparatus, the alarm timer 110 is deenergized and the alignment sensing device 10 is retracted.

Figure 4:
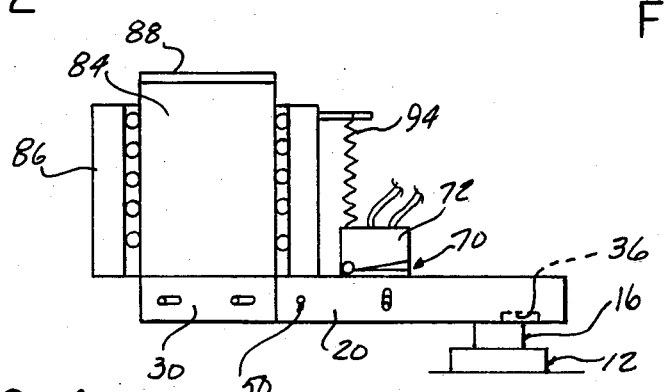
FIG. 4 is a front view showing the alignment sensing device with a first lever in a position corresponding to nonalignment of the article being sensed.

If the article 40 is not aligned with the apparatus, the slide 84 does not fully extend, see FIG. 4, because the aperture 36 does not matingly engage the outer contour of the article 40. The first lever 20 is thereby prevented from rotating into the engaged position 64, see FIG. 4, and the sensing means is not activated. The selected time period for the timer 110 expires, triggering alarm 112.

Figure 5:
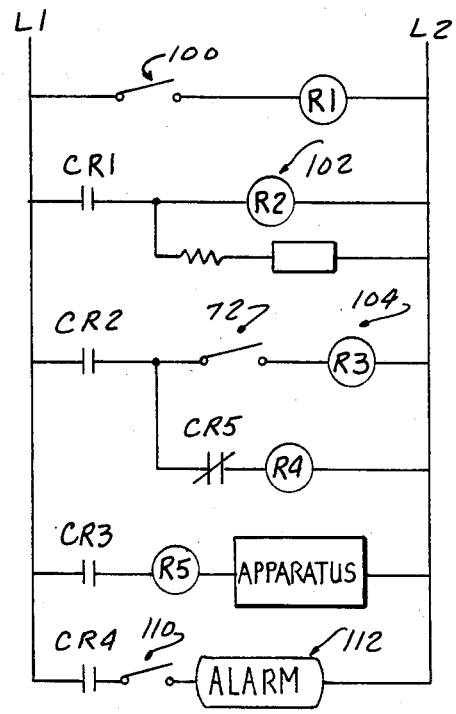
FIG. 5 is an electrical schematic view of the control circuit for the alignment sensing device.

Referring now to FIG. 5, the control circuit for the alignment sensing device 10 for illustrative purposes, and by way of a non-limiting example, comprises the following elements. A normally open switch 100 closes in response to an external signal that the article 40 is positioned on the stationary anvil 12. Closing switch 100 energizes a relay R1 which closes a normally open contact CR1. Closing contact CR1 energizes the actuator activation means 102, such as relay R2. Relay R2 initiates movement of the alignment sensing device 10 toward article 40 and closes a normally open contact CR2. Closing contact CR2 energizes the sensing means 70 and the triggering means 110 for alarm 112. The alarm circuit relay R4 is energized through a normally closed contact CR5. Relay R4, when energized, closes a normally open contact CR4, thereby energizing timer 110 with a selectable time period. Timer 110 will close a switch if the selected time period expires before timer 110 is deenergized. The switch closed by timer 110 triggers an audible and/or visual alarm 112. The sensor switch 72 will close when the first lever 20 reaches the engaged position 64 after the second lever 30 matingly engages with a portion of the outer contour of article 40. Closing sensor switch 72 energizes activating means 104 for the apparatus, such as relay R3. Relay R3 closes a normally open contact CR3, which energizes a relay R5 and the apparatus. Relay R5 opens a normally closed contact CR5, thereby deenergizing the timed switch 110.

Figure 3:
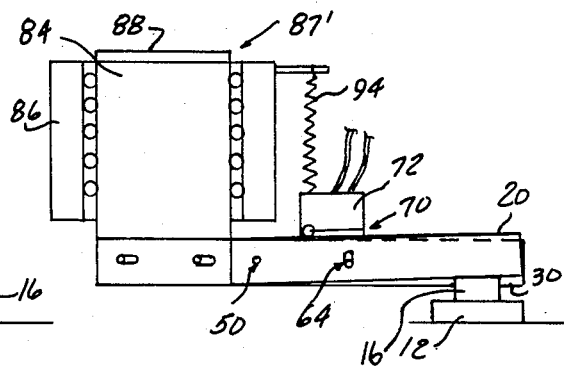
FIG. 3 is a front view of the alignment sensing device showing the first lever in an engaged position.

A method for sensing alignment of the article 40 in relation to the apparatus comprises the following steps: energizing a timer with a selectable time period and activating an alarm if alignment of the article 40 in relation to the apparatus is not sensed within the selected time period; moving the alignment sensing device 10 toward the article 40, initiating contact between the article and a first lever 20 of the alignment sensing device 10; rotating the first lever 20 relative to a second lever 30 having an aperture 36 corresponding to a portion of an outer contour of the article 40 as the alignment sensing device 10 continues to move toward the article 40; if the article 40 is aligned with the apparatus, matingly engaging the aperture 36 of the second lever 30 with a portion of the outer contour of the article 40, see FIG. 3, as the first lever 20 simultaneously reaches an engaged position 64; sensing the engaged position 64 of the first lever 20 of the alignment sensing device 10; in response to sensing the engaged position 64 of the first lever 20, activating the apparatus associated with the article 40, deenergizing the timer, and retracting the alignment sensing device 10.

What is claimed is:

1. A method for sensing alignment of an article in relation to an apparatus performing a task associated with the article requiring alignment, the method comprising the steps of:
   energizing a timer with a selectable timer period to activate an alarm if alignment of the article in relation to the apparatus is not sensed within a selected time period;
   moving an alignment sensing device toward the article;
   initiating contact between the article and a first lever of the alignment sensing device;
   rotating the first lever relative to a second lever having an aperture corresponding to a portion of an outer contour of the article as the alignment sensing device continues to move toward the article;
   matingly engaging the portion of the outer contour of the article with the aperture of the second lever as the first lever simultaneously reaches an engaged position;
   sensing the engaged position of the first lever;
   activating the apparatus associated with the article in response to sensing the engaged position of the first lever;
   deenergizing the timer; and
   retracting the alignment sensing device.

2. In a crimping method including the steps of feeding terminals integrally attached to an elongate carrier strip to a crimping station, crimping an electric terminal tightly around an electric conductor, and severing the terminal from the carrier strip during the crimping of the terminal, the improvement comprising:
   sensing alignment of the terminal after feeding the terminal to the crimping station and prior to crimping, the alignment sensing having the steps of:
   energizing a timer with a selectable time period to activate an alarm if alignment of the terminal in relation to the crimping station is not sensed within a selected time period;
   moving an alignment sensing device toward the terminal;
   initiating contact between the terminal and a first lever of the alignment sensing device;
   rotating the first lever relative to a second lever having an aperture corresponding to a portion of an outer contour of the terminal as the alignment sensing device continues to move toward the terminal;
   matingly encompassing the portion of the outer contour of the terminal with the aperture of the second lever as the first lever simultaneously reaches an engaged position;
   sensing the engaged position of the first lever;
   deenergizing the timer;
   retracting the alignment sensing device; and
   activating the crimping station to perform the crimping operation.

3. An alignment sensing device, for use with an article and an apparatus performing a task associated with the article requiring alignment of the article in relation to the apparatus, comprising:
   a first lever;
   a second lever having an aperture corresponding to a portion of an outer contour of the article;
   means for pivotally mounting the first lever to the second lever allowing pivotal rotation of the first lever relative to the second lever from a normal rest position to an engaged position;
   means mounted adjacent the first lever for sensing the first lever in the engaged position;
   means for moving the second lever in relation to the article, wherein such movement initiates contact between the first lever and the article, thereafter the first lever begins to rotate from the normal rest position toward the engaged position, subsequently when the aperture of the second lever matingly encompasses the portion of the outer contour of the article, the first lever simultaneously reaches the engaged position thereby activating the sensing means; and means, responsive to activation of the sensing means, for activating the apparatus to perform the task associated with the article.

4. The device according to claim 3, wherein the pivotal mounting means comprises a pin passing through the first lever into the second lever.

5. The device according to claim 3, further comprising a projection from the second lever slidingly engaging within a slot in the first lever wherein a first end of the slot corresponds to the normal rest position of the first lever and a second end of the slot corresponds to the engaged position of the first lever.

6. The device according to claim 3, wherein the sensing means comprises a sensor switch mounted on the second lever.

7. The device according to claim 3, wherein the activating means comprises a relay which is energized in response to activation of the sensing means and a contact which is closed when the relay is energized.

8. The device according to claim 3, wherein the moving means comprises:
    means connected to the second lever for rectilinear extension of the second lever from a normal retracted position to an extended position;
    means connected to the second lever for biasing the rectilinear extension means toward the normal retracted position; and
    means responsive to an external signal for activating the rectilinear extension means to move the rectilinear extension means against the urgings of the biasing means from the normal retracted position to the extended position.

9. The device according to claim 8, wherein the biasing means comprises a spring.

10. The device according to claim 8, wherein the rectilinear extension activating means comprises a relay energized periodically in response to an external signal indicating that the article has been positioned on the apparatus.

11. The device according to claim 8, wherein the rectilinear extension means comprises:
    a slide adjustably attached to the second lever of the alignment sensing device;
    a slide support allowing rectilinear movement of the slide within the slide support from the normal retracted position to the extended position while maintaining the slide in a fixed planar orientation;
    an actuator disposed adjacent the slide support; and
    an actuator arm connecting the actuator to the slide.

12. The device according to claim 3, further comprising means responsive to activation of the moving means for indicating non-alignment of the article after a selectable time period has passed without activation of the sensing means.

13. The device according to claim 3, further comprising means for supporting the moving means from the apparatus allowing adjustment for alignment of the aperture of the second lever with respect to the crimping apparatus.

14. A device according to claim 13, wherein the supporting means for the alignment sensing device comprises a bracket adjustably attached to the apparatus and connected to the moving means.

15. An alignment sensing device for use with a wire terminal and an electrical terminal crimping apparatus comprising:
    a first lever having a lever bracket releasably holding a lever arm;
    a second lever having a sensor bracket releasably holding a sensor arm with an aperture corresponding to a portion of an outer contour of a wire terminal;
    means for pivotally mounting the first lever bracket to the sensor bracket allowing pivotal rotation of the first lever bracket relative to the sensor bracket from a rest position to an engaged position;
    means disposed adjacent the first lever bracket for sensing the first lever bracket in the engaged position;
    a slide adjustably attached to the sensor bracket;
    a slide support allowing rectilinear movement of the slide within the slide support from a normal retracted position to an extended position while maintaining the slide in a fixed planar orientation;
    an actuator arm having two ends, a first end secured to the slide;
    an actuator secured to a second end of the actuator arm, wherein movement of the actuator toward the wire terminal initializes contact between the first lever and the wire terminal, thereafter the first lever begins to rotate from the rest position toward the engaged position as the alignment sensing device continues to move toward the wire terminal, subsequently when the aperture of the second lever matingly encompasses the portion of the outer contour of the wire terminal, the first lever simultaneously reaches the engaged position thereby activating the sensing means;
    means for activating the actuator to move the slide from the retracted position to the extended position in response to an external signal;
    means connected to the sensor bracket for biasing the slide toward the retracted position away from the wire terminal;
    means for supporting the slide support from the electrical terminal crimping apparatus allowing adjustment for proper alignment of the aperture in the sensor arm with respect to the apparatus;
    means responsive to activation of the sensing means for activating the electrical terminal crimping apparatus to crimp the wire terminal; and
    means responsive to activation of the actuator for indicating non-alignment of the wire terminal after a selectable time period has passed without activation of the sensing means.

16. In an appartus for crimping generally U-shaped traverse cross-sectional portions of an electrical terminal tightly around an electrical conductor at a crimping station wherein said terminals are fed to said crimping station, integrally attached to an elongate carrier strip and severed from said strip during the crimping of the terminal, said apparatus including stationary anvil means having a flat vertical front surface and a terminal seat at the top of said anvil means extending rearward from said front surface, crimping die means mounted above said anvil means for vertical movement between an elevated ready position spaced above said anvil and a lowered crimping position adjacent said anvil, said die means being operable upon downward movement to said crimping position to crimp the U-shaped portion of a terminal supported on said terminal seat, and cutter means mounted for vertical sliding movement against said front face of said anvil means between an elevated normal position and a lowered actuated position, said cutter means being operable during downward movement from said normal position to said actuated position to sever a terminal supported on said terminal seat from said carrier strip, the improvement combining the apparatus with an alignment sensing device comprising:
- a first lever;
- a second lever having an aperture corresponding to a portion of an outer contour of the terminal;
- means for pivotally mounting the first lever to the second lever allowing pivotal rotation of the first lever relative to the second lever from a normal rest position to an engaged position;
- means disposed adjacent the first lever for sensing the first lever in the engaged position;
- means for moving the second lever, wherein movement toward the terminal initiates contact between the first lever and the terminal, thereafter the first lever begins to rotate from the normal rest position toward the engaged position as the alignment sensing device continues to move toward the terminal, subsequently if the aperture of the second lever matingly encompasses the outer contour of the terminal, the first lever will simultaneously reach the engaged position thereby activating the sensing means;
- means, responsive to activation of the sensing means, for activating the apparatus to perform the crimping of the terminal;
- means activated concurrently with the moving means for indicating non-alignment of the terminal after a selectable time period has passed without activation of the sensing means; and
- means for supporting the moving means from the apparatus allowing adjustment for alignment of the aperture of the second lever with respect to the crimping apparatus.

* * * * *